Sept. 24, 1940.  N. BORRESEN  2,215,954
FLUID FLOW CONTROL DEVICE
Filed May 26, 1939
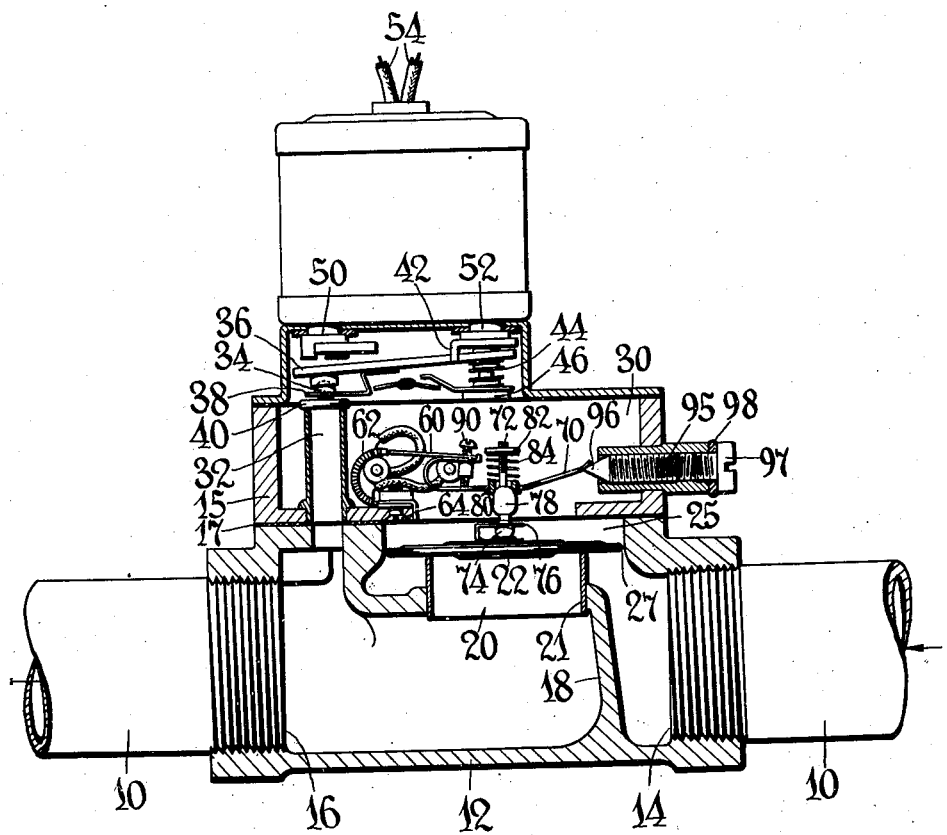
FIG. 1.
FIG. 2.
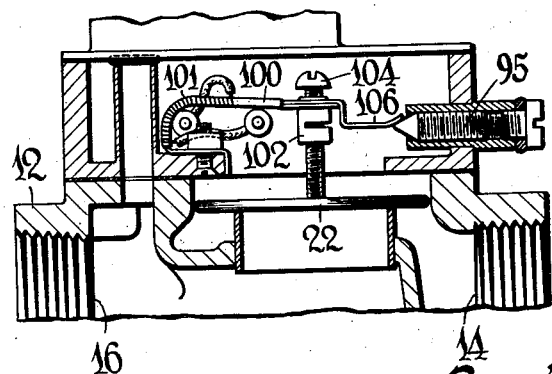
INVENTOR
NICO BORRESEN
BY
Bean, Brooks, Buckley & Bean.
ATTORNEYS Patented Sept. 24, 1940

2,215,954

UNITED STATES PATENT OFFICE 2,215,954

FLUID FLOW CONTROL DEVICE

Nico Borresen, Los Angeles, Calif., assignor to Nicostat Products Co., Buffalo, N. Y.

Application May 26, 1939, Serial No. 275,963

6 Claims. (Cl. 137—139)

This invention relates to apparatus for controlling flow of fluid, and more particularly to apparatus for controlling flow of fluid fuels in connection with intermittently operating fuel burning apparatus; this application being a continuation in part of application Serial No. 201,118 filed April 9, 1938.

One object of the invention is to provide an improved means for controlling the introduction of fluid fuel into the combustion chamber of an intermittently operating fuel burning apparatus including means for providing an initial fluid flow at an adjustably restricted rate during the early stages of each combustion operation and a full normal operating rate of flow subsequent to the development of predetermined temperature conditions in the combustion chamber.

Another object of the invention is to provide an improved means for automatically varying the rate of fuel flow into the combustion chamber of a heating apparatus in such manner that during the initial stages of combustion operation the rate of fuel flow may be restricted in a predetermined adjustable manner in accord with development of certain temperature and draft conditions in the combustion chamber.

Other objects and advantages will appear in the claims and in the specification hereinbelow, which it will be understood, is merely exemplary of the invitation.

In the drawing:

Fig. 1 is a section through a valve mechanism embodying the principles of the invention;

Fig. 2 is a fragmentary section of another form of construction of a portion of the device of Fig. 1.

Referring to the drawing, the invention is shown as being supplied in connection with a fluid control valve structure of a type that is particularly adapted for use in connection with the control of fluids such as gaseous or liquid fuels in connection with fuel burning apparatus. Fig. 1 illustrates a fluid flow control mechanism of the invention in the line of a fluid conduit 10. The flow control mechanism comprises essentially a casing 12 provided with inlet and outlet ports 14 and 16 respectively; a casing partition 18 provided with an opening 20; and a main valve 22 for controlling flow of fluid through the opening 20. A ferrule 21 is shown as being inserted within the opening 20 and having its upper marginal edge extending beyond the upper surface of the partition 18 to provide an annular upwardly extending valve seat portion for cooperation with the under surface of the main valve 22 to provide for accurate closing of the fluid control device under valve closed conditions.

The casing 12 is formed with a circular valve chamber 25 concentrically of the valve seat 21 and extending upwardly beyond the line of the upper edge of the valve seat to accommodate the main valve 22 in free floating relation and in such manner that the valve 22 may move from valve seat contacting position to various raised positions to permit flow of fluid through the opening 20. The main valve 22 is formed of a diameter slightly less than that of the valve chamber 25 so that a slight annular gap 27 is provided between the marginal edge of the valve 22 and the inner wall of the valve chamber 25. Thus, the valve chamber accommodates the main valve 22 in free floating relation therein.

An auxiliary valve chamber 30 is provided in the upper interior portion of the casing and is in open communication with the valve chamber 25, and is provided with an auxiliary outlet port 32 leading to the main outlet port 16 of the fluid flow control device. An auxiliary valve 34 for controlling flow of fluid through the auxiliary outlet port 32 is provided; and is shown as being mounted in free swivelling relation upon one end of an arm 36 by means of cooperation between a forked finger piece 38 extending in spaced relation from the arm 36 and an enlarged boss 40 mounted upon the auxiliary valve 34. The arm 36 is fulcrumed for pivotal action within the chamber 30 upon a downwardly extending portion of a bracket 42 which is rigidly mounted upon the casing structure. A coil spring 44 is arranged in such manner that one of its ends bears against the arm 36 at an end portion opposite to the auxiliary valve carrying end thereof and beyond the point of pivoting upon the bracket 42, the other end of the coil spring 44 being arranged to bear against a shoulder piece 46 extending rigidly from a portion of the casing.

An electro-magnetic device including a pair of opposed poles 50 and 52 is mounted upon the upper portion of the casing 12 with the ends of the poles 50 and 52 extending through suitable openings in the wall of the casing and in such manner that the terminal portions of the poles are disposed adjacent opposite ends of the arm 36. The electro-magnetic device comprises the usual form of core and winding arrangements, (not shown), the windings being connected in series with a pair of conductors 54 for connection in a controlled circuit of electric current (not shown). The current source may be of any desired form such as a battery, or house current connection; and the control mechanism therefor may be of any desired form such as a room temperature responsive thermostat switch, whereby in response to decrease in room temperature below a predetermined degree the control switch will close the circuit of the electro-magnetic device, and upon increase of room temperature above a predetermined level the electro-magnetic circuit will be opened by the control switch. Thus, upon decrease of room temperature below the predetermined desired degree, the electro-magnetic device will become energized and the arm 36 will be pivoted under the magnetic force of the device upon the fulcrum 42 in such manner that the auxiliary valve 34 will be moved upwardly and away from the valve seat contacting position shown in Fig. 1. Whenever the room temperature exceeds a predetermined desired degree, the electro-magnetic device will be non-energized, and the spring 44 will cause the arm 36 to return to or remain in the position illustrated in Fig. 1 wherein the auxiliary valve 34 closes the auxiliary outlet port 32.

Whenever the auxiliary valve 34 is in closed position relative to the conduit 32, the static fluid pressure within the valve chamber portions of the device above the main valve 22 builds up by reason of passage of fluid from the inlet port 14 through the gap 27 and around the main valve. Thus, when the auxiliary valve is closed, the main valve is urged toward and firmly held in closed position against the valve seat 21, and flow of fluid through the conduit 10 is prevented.

Whenever the auxiliary valve 34 is moved to open position, as by energization of the electro-magnetic device in response to operation of the temperature controlled switch hereinabove described, the previously accumulated fluid above the main valve 22 is permitted to escape through the auxiliary outlet port 32 at a rate substantially greater than the rate of inlet of fluid through the gap 27. Consequently there occurs an upsetting of the fluid pressure force condition which previously held the valve in closed position, and a newly created pressure difference condition which is developed by reason of movement of fluid through the auxiliary valve 34 operates to cause the main valve 22 to be lifted slightly from its seat. Immediately upon such action a flow of fluid directly from the inlet port 14 and through the opening 20 toward the outlet port 16 is permitted, and proceeds at maximum rate as allowed by the degree of the opening of the main valve 22. This flow of fluid from the inlet port 14 and through the opening 20 provides a further increased generation of dynamic forces directed against the underside of the valve 22 which increases the lifting forces acting thereon. Consequently, the main valve 22 is increasingly urged toward wider open positions until such time as a condition of free and unrestricted flow through the device exists. Thus, a fluid control mechanism is provided wherein movement of the auxiliary valve 34 by action of an externally controlled element provides for valve lifting fluid forces acting upon the main valve 22 for moving the latter toward full open position, and whereby movement of the auxiliary valve to a closed position by action of the externally controlled actuating element causes the development of static fluid pressure forces which operate to move the main valve toward closed position.

The main valve opening and closing operations hereinabove described are for some purposes preferably retarded by means of an independently operating mechanism which operates as a function of lapsed time during valve opening or closing movements, whereby the valve moving operations are retarded. The mechanism for retarding the operation of the main valve may comprise, as shown in Fig. 1, a bi-metallic arm 60 and a heating element 62, and a pressure adjusting connection device between the bi-metallic arm and the main valve 22. The bi-metallic arm 60 is of bowed cantilever form, one end of the arm being rigidly mounted upon a portion of the casing as by means of a screw 64. The heating element of the device is in the form of a resistance wire 62 wrapped about the bowed portion of the arm 60 and in insulated relation thereon, the opposite ends of the resistance wire being connected in parallel relation with the circuit actuating the auxiliary valve moving mechanism. Consequently whenever the electro-magnetic auxiliary valve control device is energized to valve opening condition, the heating element 62 is simultaneously energized in such manner as to generate and give off heat which slowly permeates the bi-metallic arm 60.

The bi-metallic arm 60 is provided adjacent its free end with an extension leaf 70 and a connection pin 72 which extends between the leaf 70 and the main valve 22. The pin 72 is provided at its lower end with an enlarged boss 74 of spherical form for swivable abutting connection with a forked clamp 76 rigidly mounted upon the main valve 22. The forked clamp 76 includes a pair of spaced fork arms which provide opposed shoulder elements for bearing against the boss 74, the reduced portion of the pin 72 adjacent the boss 74 being disposed within the gap between the forked arms. The pin 72 is formed with a second enlarged portion 78 disposed intermediately of the pin, the upper surface of the enlarged portion 78 being adapted to bear in swivable relation against a complementary shaped under surface of a ferrule 80 which is rigidly mounted upon the arm 70 concentrically with a circular opening formed therethrough for accommodation of the upper portion of the pin 72 in loose fitting relation therein. The upper portion of the pin 72 is threaded, and a correspondingly threaded nut 82 is provided with a suitable under surface portion for bearing against one end of a coil spring 84, the other end of the spring being arranged to bear against the arm 70 concentrically of the ferrule 80.

Thus, a connection device between the main valve 22 and the leaf 70 is provided of such nature that whenever fluid pressure forces of magnitude sufficient to unseat the main valve are directed thereagainst a lifting pressure will be directed against the leaf 70 through means of the abutting connection between the boss 78 and the leaf 70. In turn, this lifting pressure will be transmitted to the bi-metallic arm 60; and inasmuch as the leaf 70 and the arm 60 are both of resilient nature they will yield to some extent to permit the unseating of the valve. The opposing actions of the leaf 70 and the arm 60 may, of course, be regulated by varying the construction of these elements.

It is contemplated that in some instances of fuel burner operation, the initial generation of valve unseating fluid pressure forces will preferably be accompanied by an initial opening of the main valve to a restricted extent. In such case, the arms 60 and 70 are so arranged and adjusted as to normally exert no substantial downward pressure upon the valve when in closed position, and consequently, valve opening forces will operate initially to deform the resilient arms from their normal attitudes until such time as their resistance to deformation equals the valve unseating force. Thus, an initial limited opening of the main valve will be procured. Subsequently, as explained hereinabove, the heating of the bi-metallic arm 60 due to the closing of the heating element circuit by the room temperature control switch introduces attitude altering forces in the bi-metallic arm which upset the previous equilibrium, whereby the arm slowly arches further upwardly and the main valve 22 moves to successively wider open positions.

Upon opening of the room temperature controlled switch and consequent closing of the auxiliary valve 34, a composition of static and dynamic fluid pressure forces tending to move the main valve toward closed position will be generated. These forces will act directly upon the main valve dics 22, but the arm members 60 and 70 will resiliently resist such closing movement of the valve due to the fact that the bi-metallic arm 60 is in upwardly arched attitude. The resilient nature of the arms 60 and 70 will, however, permit of some downward movement of the valve 22; and also the coil spring 84 will compress to some extent to permit relative movement between the pin 72 and the leaf 70, thus allowing further downward movement of the valve 22. The elements of the device will be provided and arranged in such manner as to give any desired form of valve closing movement, and it will be understood that provision is thereby made for a restricted movement of the main valve toward closed position immediately upon opening of the room temperature controlled circuit. This movement of the valve toward closed position, however, is initially arrested by means of the resilient arm members prior to complete closing of the valve. Subsequently, however, the cooling of the bi-metallic arm 60 due to interruption of the heating element circuit contemporaneously with the opening of the auxiliary valve control circuit, allows the bi-metallic arm 60 to cool and slowly return toward its normal downwardly arched attitude; and as this cooling action proceeds the valve 22 is allowed to slowly lower toward its completely closed position. Thus, retarded opening and closing movements of the main valve 22 are provided, whereby sudden commencement and cessation of full fluid flow are avoided.

To provide for adjustments of the valve retarding mechanism, a set screw 90 is mounted in adjustable screwthreaded relation upon the arm 60 in such manner that one of its end bears against an intermediate portion of the leaf 70. Thus, adjustments of the setting of the screw 90 will vary the angular attitude between the arm 60 and the leaf 70, and will thus vary the normal position of the leaf 70 at its point of connection with the pin 72 relative to the valve seat 20. Consequently, adjustments of the screw 90 will vary the spread between the arm 60 and the leaf 70 and the normal position of the leaf 70 relative to the valve seat 20. Thus, adjustment can be so made that any desired degree of downward pressure will normally be exerted by the leaf 70 upon the valve 22 when the latter is in closed position, and various degrees of initial opening of the valve 22 prior to heating of the bi-metallic arm 60 may thus be provided for.

To provide for convenient adjustment of the rate of initial fluid flow during valve opening operations and the rate of final closing of the main valve during valve closing operations from externally of the casing of the fluid flow control mechanism, an adjustable abutment element is provided adjacent the free end of the leaf 70. This abutment element is arranged to be adjustable to different leaf contacting positions and in such manner that the abutment opposes to different extents the downward movement of the leaf 70 as the valve 22 approaches its completely closed position. As illustrated in Fig. 1, the adjustable abutment element may be in the form of a screw 95 having a conical inner end portion 96 adapted to bear against the under surface of the leaf 70. The screw 95 is arranged to extend laterally through a suitable screwthreaded opening in the casing wall and is provided at its outer end with a conventional screw driver slot or other tool engaging means. Thus the screw 95 may be axially rotated from externally of the valve casing and will thereby be moved axially in either direction whereby the conical portion 96 will be moved to either increasingly or decreasingly restrictive positions relative to the outer end of the leaf 70. Thus, the valve closing effects of the fluid pressure forces acting directly upon the main valve disc 22 and the attitude changing forces in the bi-metallic arm 60 due to the cooling of the latter will be opposed to adjusted degrees by the upwardly supporting action of the abutment 96 under the end of the leaf 70 as the main valve approaches completely closed position. Likewise, the initial opening operation of the valve disc 22 in response to valve opening fluid pressure forces will be varied by adjustment of the screw 95 from externally of the casing of the device.

To provide for improved sealing of the opening through which the adjustment screw 95 extends, and to insure that this portion of the device be leak-proof, that portion of the casing wall immediately adjacent the screw receiving opening therethrough is preferably provided of substantial thickness and of such form as to extend outwardly beyond the end of the screw 95 to permit the mounting of a closure plug 97 therein. The plug 97 is threaded into the opening and is provided with an enlarged outer shoulder portion. A gasket 98 is preferably mounted upon the plug in such manner as to be compressed between the shoulder of the plug and the opposed casing portion when the plug is tightly screwed into position. Thus, a double seal against leakage of fluid around the screw 95 and through the casing is provided.

It will be understood that the adjustable abutment element for coaction with the outer end of the leaf 70 may be of any other desired form. For example, any other form of axially movable element such as extends inwardly from a side of the casing and is provided with an inclined facet portion for coaction with the leaf 70 may be employed; or in lieu of this, the abutment element may be arranged to extend through the casing in a vertical direction and into abutting relation with the leaf 70 and will thus be adapted to directly move the leaf 70 to vertically adjusted positions relative to the valve seat 21.

Fig. 2 illustrates the application of the valve movement retarding mechanism in association with another form of connection between the bi-metallic element and the main valve disc 22. In this form of construction a simple abutment type of connection between the bi-metallic arm and the main valve is provided whereby the retarding mechanism of the device is adapted solely to alter the effects of valve opening fluid pressure forces; the valve being free to move downwardly from any open position under the influence of valve closing fluid pressure forces without restriction or retardation on the part of the bi-metallic arm and associated elements. In the figure, the bi-metallic arm 100 is shown as being of bowed cantilever form and anchored at one end to the casing 12, as in the previous form of construction. An internally threaded ferrule 102 is fixed to the arm 100 adjacent its outer end and carries in screwthreaded relation therein a screw 104, the lower end of which is adapted to bear against the upper surface of the valve 22. A leaf 106 is fixed to the end of the arm 100 and is adapted to bear at an under surface portion upon the conical shaped end of the adjustment screw 95, the operation of which is explained hereinabove. The bi-metallic arm 100 is provided with a heating element in the form of an electrical resistance wire 101 wound about a portion thereof as in the case of Fig. 1. Thus, in this form of the device the bi-metallic arm is adapted to resist and to retard in varying degrees the valve opening movements of the valve disc 22 in a manner similar to that explained hereinabove in connection with Fig. 1. The arm 100, however, will have no restrictive or retarding action in connection with valve closing movements of the valve disc 22.

It will be understood that the screw 104 may be adjusted as required to provide desired changes in initial valve movement resisting forces exerted by the arm 100 and the resultant amount of initial flow through the main valve upon opening of the auxiliary valve and the rate of change in the valve movement retarding characteristics of the device.

It will be understood that the abutment type of connection between the valve disc 22 and the valve movement retarding mechanism as shown in Fig. 2 may be employed with equal facility in connection with the bi-metallic arm and extension leaf construction of Fig. 1, and vice versa. Also, it will be understood that the extension leaf 106 of Fig. 2 may be either in the form of a separate piece of metal connected to the outer end of the bi-metallic arm 100, or it may be an integral extension of the latter. Also, it will be understood that the adjustable abutment device of Fig. 2 may be either in the form of the screw 95 as shown or in any other form of inclined facet or vertically adjustable abutment device so long as means are provided for opposing valve closing movements of the bi-metallic arm as the valve disc movement retarding mechanism approaches normal valve closed attitude.

In addition to the valve movement retarding function of the bimetallic device of Fig. 1, it also provides means for insuring against unintended sticking of the valve 22 upon the seat 20 such as might result from the presence of dirt, gummy substance or other foreign material within the valve chamber and which would otherwise overcome the valve lifting fluid forces hereinabove described which are set up whenever the auxiliary valve 40 is closed. It will be seen that as the arm 60 becomes heated it arches upwardly and will operate to propel the valve 22 away from its seat through means of the direct mechanical connection between the arm 60 and the valve. Thus, operation of the main valve 22 upon opening of the auxiliary valve 40 is positively insured.

It is contemplated that the valve movement retarding mechanism of the invention may be provided either as an integral portion of a valve mechanism, as illustrated, or in the alternative the valve movement retarding mechanism may be provided as a self-contained unit which is applicable as an accessory element to any form of disc, piston, or diaphragm type valve mechanism, or the like. In such case, the upper portion 15 of the casing structure will be provided separately of the casing portion 12 and of such form as to be adapted to mount the valve movement retarding mechanism of the invention in self-contained form and to be connected upon the casing portion 12 in fluid tight relation as by means of a gasket 17. Thus, it will be seen that the invention contemplates also the provision of a completely self-contained accessory unit which is adapted to be mounted upon any standard form of fluid control mechanism employing a movable member for retarding the initial rate of movement of the member as provided for by the primary control mechanism.

Although only a limited number of forms have been shown and described in detail, it will be apparent to those skilled in the art that the invention is not so limited but that various changes may be made therein without departing from the spirit of the invention or from the scope of the appended claims.

I claim:

1. In combination, a fluid valve casing having a valve port, a valve member adapted to be moved relative to said port, a device for retarding port closing movements of said valve member including a resilient cantilever arm formed of material adapted to change in shape under changing temperature conditions, connection means associated with the free end of said cantilever arm and said valve member, a controlled means for applying heat to said cantilever arm, and abutment means adapted to engage with a portion of said cantilever arm at a position spaced from said connection means to resiliently restrict the movement of said connection means in the direction of its valve closing movement, said abutment means being adjustable to engage said arm at different positions of said valve relative to said port from externally of said casing.

2. In a fluid flow control device, a casing having an internally disposed fluid port, a valve element movable to open and closed positions relative to said port, means for imposing resistable forces against said valve element for moving the latter toward opening and port closing positions, means for restraining movement of said valve relative to said port in response to said resistable forces comprising essentially a resilient cantilever arm formed of material adapted to change in shape under temperature conditions and having one of its ends fixedly mounted upon said casing and operatively connected to said valve element at a position intermediately of its ends, controllable means for applying heat to a portion of said cantilever arm between the region of its fixed mounting and its connection to said valve element, abutment means mounted upon said casing and adapted to engage the end portion of said cantilever arm opposed to the end portion thereof at the region of said fixed mounting of said arm upon said casing and to oppose through means of engagement of said abutment means and said resilient cantilever arm valve port closing forces acting upon said valve element.

3. In a fluid flow control device, a casing having an internally disposed fluid port, a valve element movable to open and closed positions relative to said port, means for imposing resistable forces against said valve element for moving the latter toward opening and port closing positions, means for restraining movement of said valve relative to said port in response to said resistable forces comprising essentially a resilient cantilever arm formed of material adapted to change in shape under temperature conditions and having one of its ends fixedly mounted upon said casing and operatively connected to said valve element at a position intermediately of its ends, controllable means for applying heat to a portion of said cantilever arm between the region of its fixed mounting and its connection to said valve element, abutment means mounted upon said casing and adapted to engage the end portion of said cantilever arm opposed to the end portion thereof at the region of said fixed mounting of said arm upon said casing and to oppose through means of engagement of said abutment means and said resilient cantilever arm valve port closing forces acting upon said valve element, said abutment means being movable to adjusted movement restraining positions from externally of said casing.

4. A device for regulating the rate of movement of an adjustable fluid control element which is arranged to be actuated in response to independently produced forces acting thereon, said movement regulating device comprising essentially a resilient cantilever arm formed of material adapted to change in shape under changing temperature conditions, connection means associated with the free end of said cantilever arm and said movable fluid control element, a controlled means for applying heat to said cantilever arm, and stop means adapted to engage a portion of said cantilever arm and to restrict the movement of said connection means in one direction of its movement, said stop means being movable to adjusted restrictive positions.

5. In a fluid flow control device, a casing provided with an internally located fluid port and a valve element for regulating flow of fluid therethrough, means for imparting resistable valve element moving forces to said valve element, and valve element movement retarding means including a bi-metallic element mounted upon said casing and associated with said valve element in such manner as to substantially oppose valve port opening movements of said valve under normal temperature conditions and to become altered under increased temperaturue conditions in such manner as to oppose such valve port opening movements of said valve element to lesser extents to permit said valve to move to successively greater valve port opening positions, a controlled means for applying heat to said bi-metallic arm, and an abutment means adapted to engage a portion of said valve element movement retarding mechanism and to oppose the valve opening movement opposing forces of said bi-metallic arm when the latter is in substantially the condition of its normal attitude.

6. In a fluid flow control device, a casing provided with an internally located fluid port and a valve element for regulating flow of fluid therea valve element for regulating flow of fluid therethorugh, means for imparting resistable valve element moving forces to said valve element, and valve element movement retarding means including a bi-metallic element mounted upon said casing and associated with said valve element in such manner as to substantially oppose valve port opening movements of said valve under normal temperature conditions and to become altered under increased temperature conditions in such manner as to oppose such valve port opening movements of said valve element to lesser extents to permit said valve to move to successively greater valve port opening positions, a controlled means for applying heat to said bi-metallic arm, and an abutment means adapted to engage a portion of said valve element movement retarding mechanism and to oppose the valve opening movement opposing forces of said bi-metallic arm when the latter is in substantially the condition of its normal attitude, said abutment means being movable to adjusted force opposing positions from externally of said casing.

NICO BORRESEN.